United States Patent [19]

Minagawa et al.

[11] Patent Number: 4,473,518
[45] Date of Patent: Sep. 25, 1984

[54] PROCESS FOR PREPARING A PHOSPHOR

[75] Inventors: Yukinori Minagawa; Masachika Yaguchi, both of Ebina, Japan

[73] Assignees: Mitsubishi Chemical Industries Ltd.; Kasei Optonix, Ltd., both of Tokyo, Japan

[21] Appl. No.: 399,116

[22] Filed: Jul. 16, 1982

[30] Foreign Application Priority Data

Jul. 20, 1981 [JP] Japan .............................. 56-112204

[51] Int. Cl.$^3$ ............................................. C09K 11/46
[52] U.S. Cl. ............................... 264/56; 252/301.4 R; 252/301.4 S; 252/301.4 H; 264/21
[58] Field of Search ................. 252/301.4 R, 301.4 S, 252/301.4 F, 301.4 H; 264/56, 67, 118, 140, 21

[56] References Cited

U.S. PATENT DOCUMENTS 3,301,791  1/1967  Brixner ...................... 252/301.4 R
4,370,287  1/1983  Thompson ............... 252/301.4 R X

FOREIGN PATENT DOCUMENTS 323429  2/1972  U.S.S.R. ...................... 252/301.4 F

Primary Examiner—Jack Cooper
Attorney, Agent, or Firm—Oblon, Fisher, Spivak, McClelland & Maier

[57] ABSTRACT

A process for preparing a rare earth oxide type phosphor comprises compressing a starting mixture composed essentially of a matrix material for said rare earth oxide type phosphor, an activator material and a flux under a presssure of from 250 to 1500 kg/cm$^2$ to form a compact, and firing and unbinding the compact thereby obtained.

7 Claims, 4 Drawing Figures

PROCESS FOR PREPARING A PHOSPHOR

BACKGROUND OF THE INVENTION

1. Field of the Invention

The present invention relates to a process for preparing a rare earth oxide type phosphor. More particularly, it relates to a process for preparing a rare earth oxide type phosphor comprising compressing a starting material for the rare earth oxide type phosphor, followed by firing and pulverizing a compact thereby obtained.

2. Description of the Prior Art

In recent years, a phosphor having a sharp particle size distribution has been desired to obtain a high luminance for a phosphor layer and to improve the coating properties required for forming the phosphor layer. In this respect, it has been common to employ a classification means such as sieving or decantation to remove coarse particles and fine particles from a fired phosphor and thereby to obtain a sharp particle size distribution. However, in such a method, the yield is extremely poor. In order to improve the yield, various researches have been made on the starting materials and fluxes to obtain a fired phosphor which per se has a sharp particle size distribution. However, none of the improvements so far made are totally satisfactory.

Further, it has been a tendency in recent years to employ so-called rare earth phosphors in which rare earth elements are used for the phosphors and which require a high temperature and a long period of time for firing. Costs for the materials and the production costs are thereby extremely high, and due to the above mentioned requirements for the firing, it is difficult to obtain an improved particle size distribution. Under the circumstances, it is strongly desired to improve the yield i.e. to obtain a fired phosphor having a sharp particle size distribution.

SUMMARY OF THE INVENTION

Accordingly it is an object of the present invention to overcome the above mentioned difficulties in the conventional processes and to provide a process for preparing a phosphor having a sharp particle size distribution.

The present inventors have conducted an extensive research to overcome the above mentioned difficulties and, as a result, have found that with respect to the rare earth oxide type phosphors, the difficulties may be overcome by the following process. Thus, the present invention has been accomplished.

Namely, the present invention provides a process for preparing a rare earth oxide type phosphor which comprises compressing a starting mixture composed essentially of a matrix material or said rare earth oxide type phosphor, an activator material and a flux under a pressure of from 250 to 1500 kg/cm$^2$ to form a compact, and firing and unbinding the compact thereby obtained.

The rare earth oxide type phosphor obtained by the process of the present invention has a sharp particle size distribution, whereby not only the yield but also the luminance is improved. Further, the starting mixture is compacted prior to the firing to such an extent that the volume is reduced by about 20 to 40%. Accordingly, even when a conventional firing vessel is used, the production rate is increased by about 25 to 80% as compared with the conventional production rate, and thus the production efficiency is thereby remarkably improved.

As a process similar to the process of the present invention, there has been proposed a method in which a halophosphate phosphor is compressed under a low pressure (i.e. from 50 to 150 kg/cm$^2$) to prevent evaporation of antimony added as a flux to the phosphor starting material (see Japanese Patent Laid Open No. 151079/1980). However, the present invention differs from such a method in the phosphor starting material, and the pressure for compacting in the process of the present invention is an high as 250 to 1500 kg/cm$^2$, i.e. considerably higher than the conventional method.

DETAILED DESCRIPTION OF THE PREFERRED EMBODIMENTS

Figure 1:
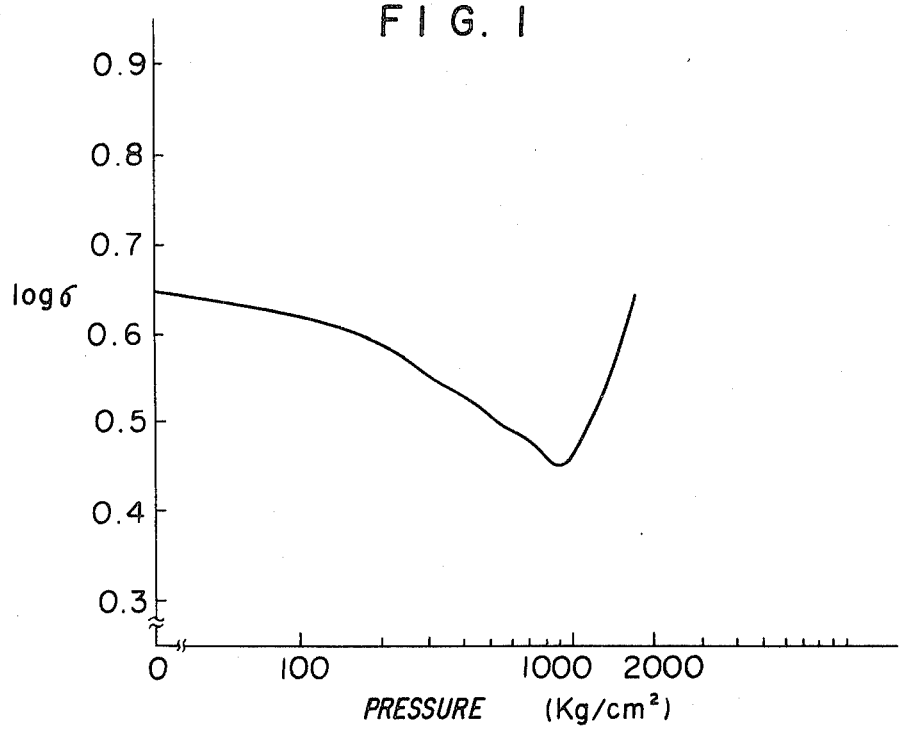
FIG. 1 is a graph showing a relation between the pressure for compressing the starting mixture of phosphor materials and the particle size distribution of the phosphor thereby obtained.

Now, the present invention will be described in detail.

As the matrix material for the rare earth oxide type phosphor to be used in the process of the present invention, there may be mentioned oxides of rare earth elements such as lanthanum (La), cerium (Ce), gadolinium (Gd), lutetium (Lu) and yttrium (Y); compounds of rare earth elements such as nitrates or carbonates which are capable of being readily converted into their oxides when subjected to a high temperature; and other matrix materials such as silicon dioxide, boric acid, sulfur and a halide. If the average particle size of the particles of the compound of a rare earth element as the starting material is excessively large, the particle size of the phosphor obtainable by firing will be thereby influenced. It is usually desired that the rare earth phosphor has a particle size of from 3 to 15$\mu$. Accordingly, it is desirable that the average particle size of the above mentioned compound of a rare earth element is at most the particle size of the desired phosphor.

The activator material is a compound of an element which is capable of constituting a luminescence center for the above matrix or which is present at the luminescence center and capable of intensifying the liminescence. For instance, there may be used oxides of e.g. cerium (Ce), praseodymium (Pr), neodymium (Nd), samarium (Sm), europium (Eu), terbium (Tb), dysprosium (Dy), erbium (Er), thulium (Tm), ytterbium (Yb) and tin (Sn); and compounds of such elements such as nitrates or carbonates which are capable of being readily converted to their oxides when subjected to a high temperature.

As the flux, there may be used a flux which is commonly used in the conventional process for the production of phosphors. For instance, as typical fluxes, there may be mentioned ammonium chloride and lithium chloride. The amount of the flux is from 20 to 80% by weight, preferably from 30 to 50% by weight, based on the total amount of the materials.

In addition to the above mentioned main starting material for the phosphor, there may be incorporated a small amount of other additives or materials for controlling the firing atmosphere such as carbon, sulfur or a halogen or their compounds, which are commonly used in the conventional processes.

After thoroughly mixing the above mentioned starting materials in e.g. a mortar, the mixture is compressed under a pressure of from 250 to 1500 kg/cm² to form a compact. As a method for compacting the mixture, there may be used any conventional method commonly used for compacting a powder material, such as a metal die press or an isostatic press (i.e. a static hydraulic press) in the present invention. However, it is preferred to use an isostatic press for compacting the mixture of the starting materials, in view of e.g. the particle size distribution (log $\sigma$) thereby obtainable.

In the present invention, it is usual that the above mentioned compact is placed in a heat resistant vessel such as a crucible and fired at a high temperature (i.e. from 800° to 1600° C.). One or several compacts may be placed in the heat resistant vessel for firing. It is preferred that the above mentioned material for controlling the firing atmosphere or compacts of such material are placed on or around the compact (s) in the vessel. In this manner, a fired compact of a desired rare earth oxide type phosphor such as a rare earth oxide phosphor, a rare earth oxysulfide phosphor or a rare earth oxyhalide phosphor, is obtainable.

Then, this fired compact is unbound to obtain a desired powdery phosphor. The unbinding method may vary depending upon the hardness of the particular fired compact. When the flux is used in the above specified amount, the fired compact thereby obtained can readily be unbound by e.g. loosening it in water. To ensure the unbinding of the fired compact, a physical vibratory force may be imparted thereto by e.g. stirring or shaking. Namely, the fired compact obtained by the compression under a pressure within the range specified in the present invention, can readily be unbound by a simple method, e.g. by leaving the fired compact in water for an extended period of time and by loosening it with use of a sieve. Practically, it is preferred that the phosphor particles loosened in water are taken out from water and subjected to shaking by a vibration sieve to ensure the disintegration of the particles and to remove coarse particles if any.

As specific examples of the phosphors obtainable by the process of the present invention, there may be mentioned a europium-activated rare earth oxysulfide phosphor ($Ln_2O_2S:Eu$), a terbium-activated rare earth oxysulfide phosphor ($Ln_2O_2S:Tb$), a europium-activated rare earth oxide phosphor ($Ln_2O_3:Eu$), a europium-activated rare earth vanadate phosphor ($LnVO_4:Eu$), a terbium-activated rare earth oxybromide phosphor ($LnOBr:Tb$), a europium-activated rare earth borate phosphor ($LnBO_3:Eu$), a europium-activated rare earth silicon molybdate phosphor ($LnSiMoO_8:Eu$), and a cerium and terbium-activated rare earth silicate phosphor ($LnSiO_5:Ce,Tb$), where Ln is at least one of Y, Gd, La and Lu.

The phosphors obtained by the process of the present invention as described above, have the following properties.

FIG. 1 is a graph showing a relation between the pressure for compressing the starting materials for the preparation of a phosphor and the particle size distribution of the phosphor thereby obtained. ($Y_2O_3$ having an average particle size of $3\mu$ was used as the matrix material and the starting mixture was compressed to form a cylindrical compact of 100 mm$\phi \times$ 100 mm.) It is apparent from this Figure that upto a pressure of about 200 kg/cm², the particle size distribution (i.e. the standard deviation log $\sigma$) decreases almost constantly with a small inclination with an increase of the pressure; from a pressure of 250 kg/cm² to a pressure of 900 kg/cm², log $\sigma$ decreases sharply; when the pressure exceeds 900 kg/cm², log $\sigma$ increases inversely; and when the pressure exceeds 1700 kg/cm², log $\sigma$ becomes greater than that of the conventional phosphor obtained without being compressed. The phosphor prepared by the present invention with application of the compression under a pressure of from 250 to 1500 kg/cm² is superior in its particle size distribution to the conventional phosphor prepared by firing without the preliminary compacting.

Figure 2:
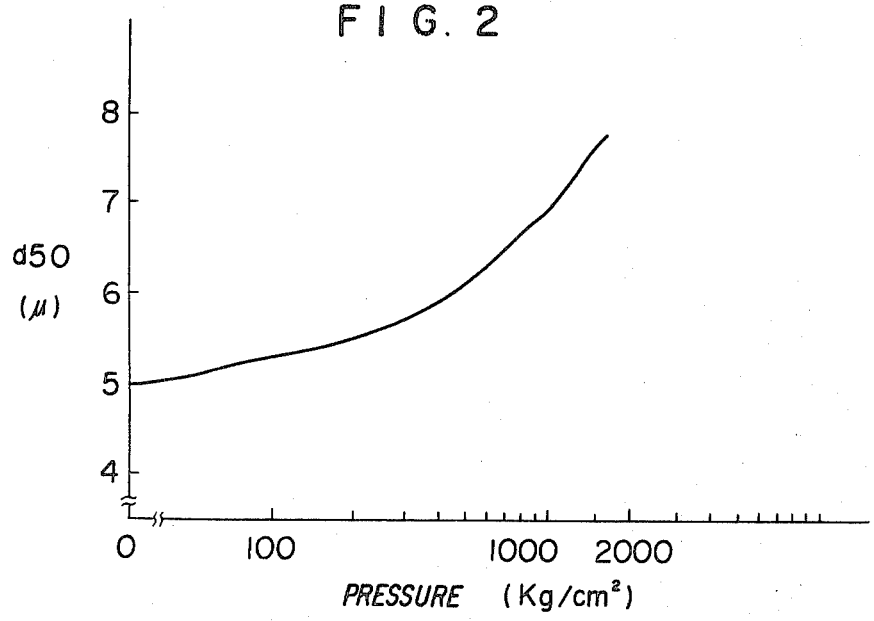
FIG. 2 is a graph showing a relation between the compressing pressure and the median particle size of the phosphor thereby obtained.

FIG. 2 shows a relation between the compressing pressure and the median particle size (d 50) with respect to a phosphor prepared by the process of the present invention in which as the matrix material constituting a main component of the phosphor, a material having a median particle size (d 50) of $3\mu$ was used. As will be seen according to the present invention, there is a certain constant relation between the compressing pressure and the median particle size (d 50) and log $\sigma$, and it is possible to select the pressure depending upon a desired particle size and thereby to obtain a phosphor having a desired median particle size (d 50) and a extremely sharp particle size distribution (log $\sigma$). Accordingly, the yield of the phosphor can thereby be remarkably improved.

Figure 3:
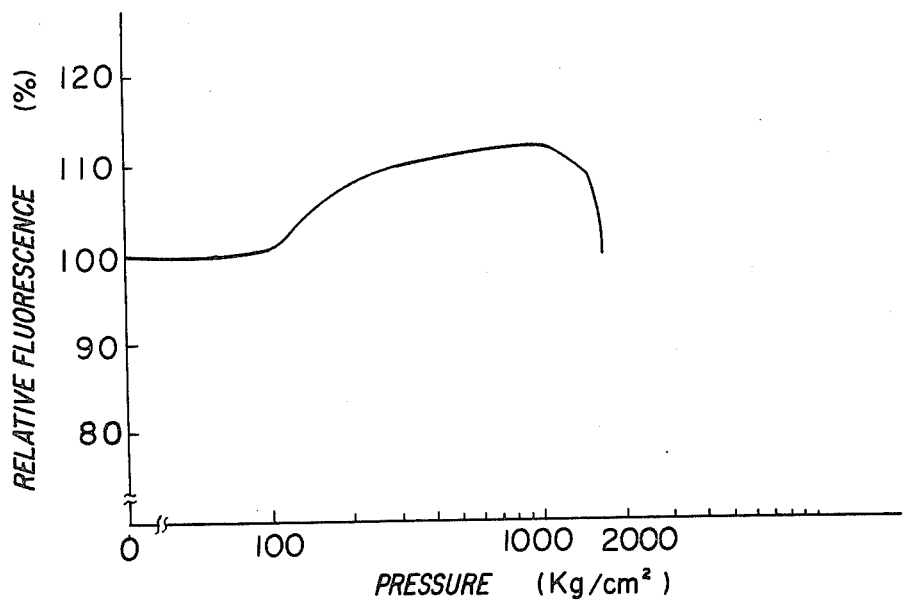
FIG. 3 is a graph showing a relation between the compressing pressure and the relative fluorescence of the phosphor thereby obtained.

Further, as shown in FIG. 3, with respect to the rare earth oxide type phosphor obtainable by the present invention, the luminance can be improved by 0 to some 10% within a certain pressure range. Particularly, a high lumnance is obtainable within a range of from 200 to 1600 kg/cm², and especially when the pressure is within a range of from 250 to 1500 kg/cm², the luminance is increased by about 10% over the conventional phosphor.

Figure 4:
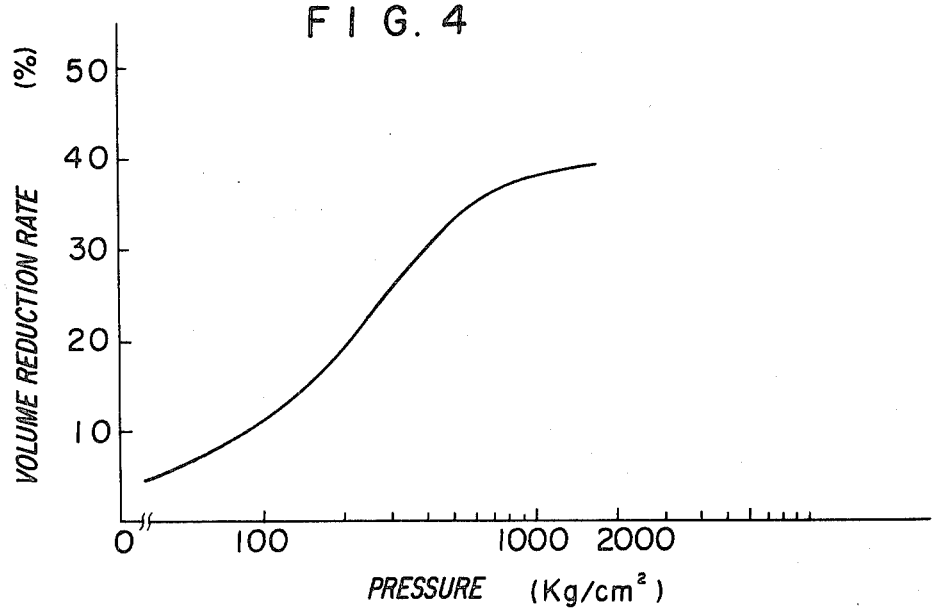
FIG. 4 is a graph showing the compressing pressure and the volume reduction rate.

Further, the rare earth oxide type phosphor obtained by the present invention, exhibits a volume reduction rate relative to the pressure for compression, as shown in FIG. 4. Accordingly, within a pressure range of from 250 to 1500 kg/cm², the production rate can be increased by from 25 to 80% by volume over the conventional method by using the same apparatus as the conventional one. Besides, it is thereby possible to improve not only the particle size distribution of the phosphor but also the luminance, as mentioned above.

In view of all of the above effects, a pressure range of 300 to 1000 kg/cm², especially from 550 to 1000 kg/cm² is practically most advantageous.

As a result of a further research, the present inventors have found that there is a certain relation between the configuration of the compact obtained by the compression and the particle size distribution. Namely, the particle size distribution is improved when the compact has a configuration, of which the ratio of the length of its longest side to the length of its shortest side is within a range of 1:1 to 10:1. If the configuration of the compact is outside the above range, the particle size distribution of the phosphor thereby obtainable tends to be inferior to the one obtained from the compact having the above mentioned configuraiton. It is particularly preferred that the configuration of the compact is such that the ratio of the length of the longest side to the length of the shortest side is within a range of 1:1 to 3:1.

Now, the present invention will be described with reference to Examples.

EXAMPLE 1

Yttrium oxide ($Y_2O_3$) (the average particle size of $3\mu$) as the matrix material, europium oxide ($Eu_2O_3$) as the activator material and sodium carbonate ($Na_2CO_3$) as the flux, were mixed in a conventional ratio. After thoroughly mixing them, the mixture obtained was compressed under a pressure of 800 kg/cm² by means of a rubber press i.e. an isostatic press, to obtain a compact of a cylindrical configuration having a diameter of 100 mm$\phi$ and a height of 100 mm. This compact was placed in a crucible and fired at a temperature of 1100° C. for 2 hours. Thereafter, the sintered compact was loosened in water, and then dried to obtain a europium-activated yttrium oxide phosphor ($Y_2O_3$:Eu). The particle size distribution of this phosphor was d $50=6.8\mu$ and log $\sigma=0.47$. Thus, the phosphor having an extremely sharp particle size distribution was obtained. Further, the luminance was improved by 5% as compared with the phosphor obtained by the conventional process.

EXAMPLE 2

Gadolinium oxide ($Gd_2O_3$) (the average particle size of $3\mu$) and sulfur (S) as the matrix materials, terbium oxide ($Tb_3O_7$) as the activator material and sodium carbonate as the flux, were mixed in a conventional ratio. After thoroughly mixing them, the mixture obtained was compressed in the same manner as in Example 1 to obtain a compact. This compact was placed in a crucible and fired at a temperature of 1200° C. for 2 hours. Thereafter, the fired compact was loosened in water, and then dried to obtain a terbium-activated gadolinium oxysulfide phosphor ($Gd_2O_2S$:Tb). The particle size distribution of this phosphor was d $50=6.9\mu$ and log $\sigma=0.46$. Thus, the phosphor having an extremely sharp particle size distribution was obtained. Further, the luminance was improved by 10% as compared with the phosphor obtained by the conventional process.

EXAMPLE 3

Lanthanum oxide ($La_2O_3$) (the average particle size of $3\mu$) and sodium bromide (NaBr) (the average particle size of $3\mu$) as the matrix materials, terbium oxide ($Tb_3O_7$) as the activator material and sodium carbonate ($Na_2CO_3$) as the flux, were mixed and compressed in the same manner as in Example 1 to obtain a compact. The firing was carried out in the same manner as in Example 1 except that the temperature was 1000° C., whereupon a terbium-activated lanthanum oxybromide phosphor (LaOBr:Tb) was obtained. The particle size distribution of this phosphor was d $50=6.6\mu$ and log $\sigma=0.47$. Thus, the phosphor having an extremely sharp particle size distribution was obtained. Further, the luminance was improved by 9% as compared with the phosphor obtained by the conventional process.

EXAMPLE 4

A compact was prepared in the same manner as in Example 1 except that the average particle size of yttrium oxide ($Y_2O_3$) as the matrix material was $6\mu$, and the pressure for compression was 600 kg/cm².

The compact was placed in a crucible and fired at a temperature of 1200° C. for 2 hours. Thereafter, the fired compact was loosened in water, and then dried to obtain a europium-activated ytrrium oxide phosphor ($Y_2O_3$:Eu). The particle size distribution of this phosphor was d $50=6.3\mu$ and log $\sigma=0.48$. Thus, the phosphor having a sharp particle size distribution was obtained. Further, the luminance was improved by 4% as compared with the phosphor obtained by the conventional process.

EXAMPLE 5

A europium-activated yttrium oxide phosphor ($Y_2O_3$:Eu) was prepared in the same manner as in Example 4 except that the pressure for compression was 950 kg/cm². The particle size distribution of this phosphor was d $50=7.0\mu$ and log $\sigma=0.45$. Thus, the phosphor having a sharp particle size distribution was obtained. Further, the luminance was improved by 8% as compared with the phosphor obtained by the conventional process.

We claim:
1. A process for preparing a rare earth oxide type phosphor, which comprises:
   (a) preparing a rare earth metal oxide matrix material by compressing a rare earth metal oxide or a compound of a rare earth metal readily convertible into an oxide optionally with sulfur or a halide, an activator and from 20 to 80% by weight of a flux, based on the total weight of phosphor material, under a pressure of from 250 to 1500 kg/cm² to form a compact;
   (b) firing said compact; and
   (c) unbinding the compact by loosening the same in water; thereby obtaining a rare earth oxide type phosphor selected from the group consisting of a rare earth oxide phosphor, a rare earth oxysulfide phosphor and a rare earth oxyhalide phosphor, the rare earth type phosphor exhibiting a higher luminance than said phosphor prepared as above but where the compressing pressure is either lower than 250 kg/cm² or higher than 1500 kg/cm².

2. The process for preparing a rare earth oxide type phosphor according to claim 1 wherein the pressure is from 300 to 1000 kg/cm².

3. The process for preparing a rare earth oxide type phosphor according to claim 2 wherein the pressure is from 550 to 1000 kg/cm².

4. The process for preparing a rare earth oxide type phosphor according to claim 1 wherein the amount of the flux is from 30 to 50% by weight, based on the total amount of the materials.

5. The process for preparing a rare earth oxide type phosphor according to claim 1 wherein the compact is formed to have a ratio of the length of its longest side to the length of its shortest side within a range of from 1:1 to 10:1.

6. The process for preparing a rare earth oxide type phosphor according to claim 5 wherein the ratio of the length of the longest side to the length of the shortest side is within a range of from 1:1 to 3:1.

7. The process for preparing a rare earth oxide type phosphor according to claim 1 wherein the compact is formed by means of an isostatic press.

* * * * *